United States Patent
Konno

(10) Patent No.: US 8,391,606 B2
(45) Date of Patent: Mar. 5, 2013

(54) IMAGE PROCESSING DEVICE, IMAGE PROCESSING METHOD, AND COMPUTER READABLE MEDIUM

(75) Inventor: Yuya Konno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 245 days.

(21) Appl. No.: 12/958,691

(22) Filed: Dec. 2, 2010

(65) Prior Publication Data

US 2011/0286668 A1    Nov. 24, 2011

(30) Foreign Application Priority Data

May 24, 2010    (JP) ................. 2010-117883

(51) Int. Cl.
*G06K 9/18*    (2006.01)
(52) U.S. Cl. ...................................... 382/182
(58) Field of Classification Search .......... 382/182
See application file for complete search history.

(56) References Cited

U.S. PATENT DOCUMENTS

| | | | |
|---|---|---|---|
| 7,486,821 B2 * | 2/2009 | Lim et al. ............. | 382/182 |
| 7,786,995 B2 * | 8/2010 | Abe et al. ............. | 345/469 |

FOREIGN PATENT DOCUMENTS

| | | |
|---|---|---|
| JP | 05-233873 A | 9/1993 |
| JP | 2000-306041 A | 11/2000 |
| JP | 2003-046746 A | 2/2003 |
| JP | 2003-271897 A | 9/2003 |

\* cited by examiner

*Primary Examiner* — Samir Ahmed
*Assistant Examiner* — Totam Le
(74) *Attorney, Agent, or Firm* — Sughrue Mion, PLLC

(57) ABSTRACT

An image processing device includes a storage module, character recognition module, a circumscribed rectangle extraction module, a ratio extraction module, and a character size calculation module. The storage module stores a reference ratio between a reference size of a reference circumscribed rectangle and a reference character size in a reference character image representing a reference character in association with a reference character identification code which uniquely identified the reference character. The character recognition module recognizes a character image in an image to get a character identification code from the recognized character image. The circumscribed rectangle extraction module extracts a circumscribed rectangle of the character image. The ratio extraction module extracts the reference ratio corresponding to the reference character identification code stored in the storage module based on the character identification code. The character size calculation module calculates a character size of the character image.

7 Claims, 13 Drawing Sheets

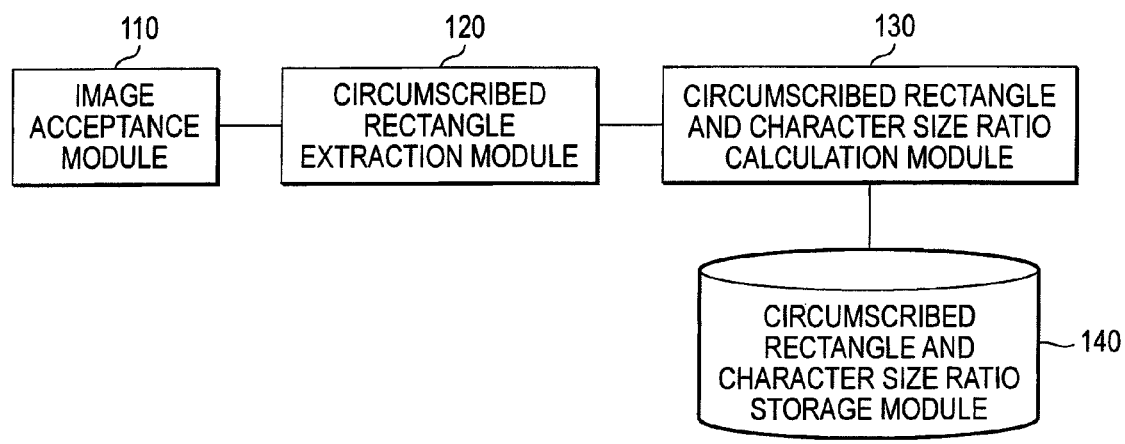

| CHARACTER CODE | CIRCUMSCRIBED RECTANGLE AND CHARACTER SIZE RATIO IN FONT A | CIRCUMSCRIBED RECTANGLE AND CHARACTER SIZE RATIO IN FONT B |
|---|---|---|
| a | xa : ya | va : wa |
| b | xb : yb | vb : wb |
| c | xc : yc | vc : wc |
| ... | ... | ... |

FIG. 10

| CHARACTER CODE | FONT TYPE | PROJECTION FEATURE |
|---|---|---|
| a | FONT A | ... |
| a | FONT B | ... |
| ⋮ | ⋮ | ⋮ |
| b | FONT A | ... |
| b | FONT B | ... |
| ⋮ | ⋮ | ⋮ |

| CHARACTER CODE | FONT A CHARACTER IMAGE | FONT B CHARACTER IMAGE | ... |
|---|---|---|---|
| a | ... | ... | ... |
| b | ... | ... | ... |
| c | ... | ... | ... |
| ⋮ | ⋮ | ⋮ | ⋮ |

1110  1120  1130  1000

IMAGE PROCESSING DEVICE, IMAGE PROCESSING METHOD, AND COMPUTER READABLE MEDIUM

CROSS-REFERENCE TO RELATED APPLICATIONS

This application is based upon and claims priority under 35 USC 119 from Japanese Patent Application No. 2010-117883, filed May 24, 2010.

BACKGROUND

Technical Field

This invention relates to an image processing device, an image processing method, and computer readable medium.

SUMMARY OF THE INVENTION

According to an aspect of the invention, an image processing device includes a storage module, character recognition module, a circumscribed rectangle extraction module, a ratio extraction module, and a character size calculation module. The storage module stores a reference ratio between a reference size of a reference circumscribed rectangle and a reference character size in a reference character image representing a reference character in association with a reference character identification code which uniquely identified the reference character. The character recognition module recognizes a character image in an image to get a character identification code from the recognized character image. The circumscribed rectangle extraction module extracts a circumscribed rectangle of the character image. The ratio extraction module extracts the reference ratio corresponding to the reference character identification code stored in the storage module based on the character identification code. The character size calculation module calculates a character size of the character image based on a size of the circumscribed rectangle and the reference ratio extracted by the ratio extraction module.

BRIEF DESCRIPTION OF THE DRAWINGS

Exemplary embodiments of the invention will be described in detail based on the following figures, wherein:

FIG. 1 is a conceptual module block diagram about a configuration example of an image processing device for generating a circumscribed rectangle and character size ratio table;

FIG. 2 is a schematic representation to show a data configuration example of a circumscribed rectangle and character size ratio table;

FIG. 10 is a schematic representation to show a data configuration example of a font feature table;

FIG. 11 is a schematic representation to show a data configuration example of a font character image table;

DETAILED DESCRIPTION

Figure 3:
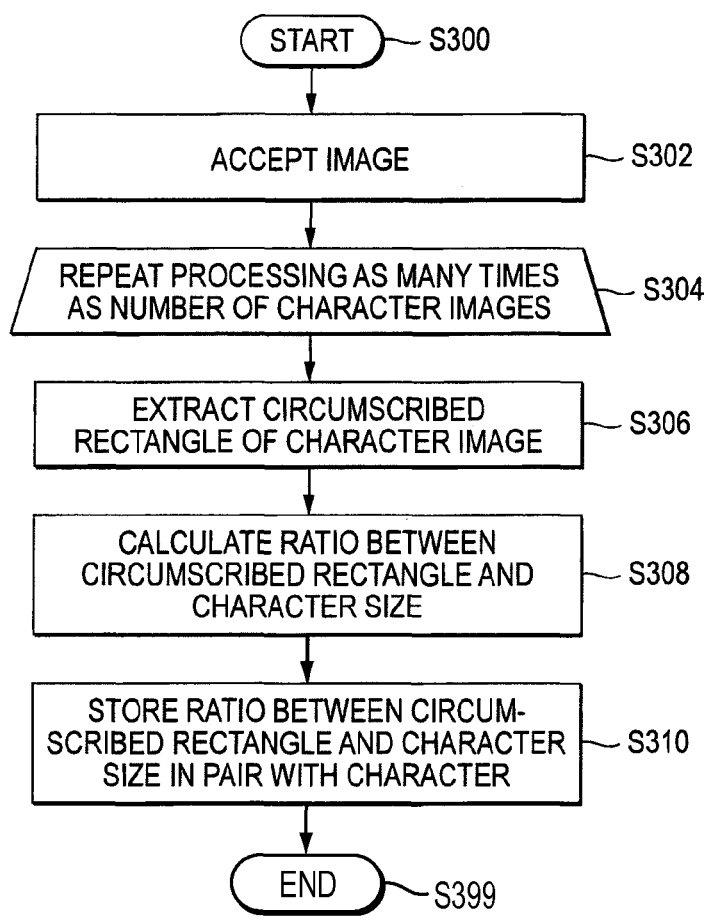
FIG. 3 is a flowchart to show a generation processing example of the circumscribed rectangle and character size ratio table.

Various preferred exemplary embodiments for carrying out the invention will be discussed below based on the accompanying drawings:

First Exemplary Embodiment

To begin with, a processing example of generating a circumscribed rectangle and character size ratio table 200 as preprocessing will be discussed. FIG. 1 is a conceptual module block diagram about a configuration example of an image processing device for generating the circumscribed rectangle and character size ratio table 200.

A module refers to a generally and logically detachable component of software (computer program), hardware, etc. Therefore, the module in the exemplary embodiments means not only a module in a computer program, but also a module in the hardware configuration. Therefore, the exemplary embodiments also serve as the description of a computer program (a program for causing a computer to execute steps, a program for causing a computer to function as means, a program for causing a computer to implement functions), a system, and a method for functioning as the modules. For the convenience of the description, "store" and its equivalent word are used, however, if the exemplary embodiment is a computer program, the words are used to mean storing in storage or controlling so as to store in storage. Modules may be in a one-to-one correspondence with functions; however, in implementation, one module may be one program or two or more modules may make up one program or two or more programs may make up one module. Two or more modules may be executed by one computer or one module may be executed in two or more computers in a distributed or parallel environment. One module may contain any other module. In the description to follow, the term "connection" is used to mean not only physical connection, but also logical connection (data transfer, command, reference relationship between data pieces, etc.,). The term "predetermined" refers to determined before target processing and is used to mean not only determined before start of processing according to exemplary embodiment, but also determined in response to the situation or the state at the time or the situation or the state so far if the time is before the target processing even if the time is after the processing according to exemplary embodiment is started.

The system or device (apparatus) is not only provided by connecting a plurality of computers, hardware devices, units, etc., by communication means such as a network (containing peer-to-peer communication connection), etc., but also implemented as one computer, hardware device, apparatus, etc. The "device (apparatus)" and the "system" are used as synonyms. The "system" does not contain a social "mechanism" of artificial arrangement, of course.

Target information is read from storage for each processing by each module or for each processing if a plurality of types of processing are performed in a module and after the processing is performed, the processing result is written to storage. Therefore, description of read from storage before processing and write to storage after processing may be omitted. The storage may contain hard disk, RAM (Random Access Memory), an external storage medium, storage through a communication line, a register in a CPU (Central Processing Unit), etc.

The image processing device shown in the example in FIG. 1 has an image acceptance module 110, a circumscribed rectangle extraction module 120, a circumscribed rectangle and character size ratio calculation module 130, and a circumscribed rectangle and character size ratio storage module 140.

The image acceptance module 110 is connected to the circumscribed rectangle extraction module 120 and accepts an image containing a character image and passes the image to the circumscribed rectangle extraction module 120. The image is an image as a sample and is an image containing a character image where characters and the character size are already determined. For example, it is an image provided by reading a document where a character image of one character size is printed through a scanner, etc. Alphabetic characters (containing uppercase and lowercase characters), kanji characters, hiragana characters, katakana characters, etc., are printed. For example, the document is a document where characters of a predetermined character size are printed in one order (specifically, alphabetic order, JIS code order, etc.,), in an area of a predetermined size. Such a sample image is used to measure the size of an actual circumscribed rectangle.

The term of character size may be called font size. In some documents, the circumscribed rectangle size is called character size. In the Specification, however, the circumscribed rectangle size and the character size are used as different terms. The circumscribed rectangle size is described later.

The circumscribed rectangle extraction module 120 is connected to the image acceptance module 110 and the circumscribed rectangle and character size ratio calculation module 130, extracts the circumscribed rectangle of a character image in the image acceptance module 110, and passes the size of the circumscribed rectangle to the circumscribed rectangle and character size ratio calculation module 130 in association with a character identification code.

The circumscribed rectangle is the minimum rectangle surrounding a character image. Therefore, in a coordinate system with the vertical axis as an X axis and the horizontal axis as a Y axis, the X coordinate of the left side of the circumscribed rectangle is the X coordinate of the leftmost pixel of the character image, the X coordinate of the right side of the circumscribed rectangle is the X coordinate of the rightmost pixel of the character image, the Y coordinate of the upper side of the circumscribed rectangle is the Y coordinate of the top pixel of the character image, and the Y coordinate of the lower side of the circumscribed rectangle is the Y coordinate of the bottom pixel of the character image.

The size of the circumscribed rectangle refers to either or both of the longitudinal length and the lateral width. The character size also refers to either or both of the longitudinal length and the lateral width and may correspond to the size of the circumscribed rectangle.

The unit indicating the size of the circumscribed rectangle may be the number of pixels (the number of dots) or may be points of the unit of the size of a type character or the like. The unit of the character size may be the number of pixels (the number of dots), points, etc., if the unit corresponds to the unit of the size of the circumscribed rectangle.

Normally, the character size and the size of the circumscribed rectangle of the character image differ, because the character size is often defined containing the surrounding blank of the character image. Therefore, generally the character size is larger than the size of the circumscribed rectangle.

Since the character in the image is known, the extracted circumscribed rectangle is associated with a character identification code. For example, a character image existing in an area of a predetermined size is extracted in one determined order and the size of the circumscribed rectangle of the character image is measured. Character identification codes are associated according to the order.

The character identification code (hereinafter, also called character code) may be a code uniquely identifying a character. For example, it may be a code defined as standard for information exchange such as JIS code or Unicode or may be a code defined for uniquely identifying a character in the exemplary embodiment rather than defined as the standard.

The circumscribed rectangle and character size ratio calculation module 130 is connected to the circumscribed rectangle extraction module 120 and the circumscribed rectangle and character size ratio storage module 140, calculates the ratio between the size of the circumscribed rectangle of character image and the character size for each character and causes the circumscribed rectangle and character size ratio storage module 140 to store the ratio between the size of the circumscribed rectangle in the character image representing the character and the character size corresponding to the character code. The character size of the character image is already known and the circumscribed rectangle of the character image is obtained from the circumscribed rectangle extraction module 120. The ratio may be represented as the ratio like a:b or may be represented as a fraction ((size of circumscribed rectangle of character image/character size) or (character size/size of circumscribed rectangle of character image)) or a decimal fraction form of the fraction. Since the size of the circumscribed rectangle is either or both of the longitudinal length and the lateral width of the circumscribed rectangle as described above, the ratio may be the ratio between the longitudinal length of the circumscribed rectangle and the longitudinal length of the character size, the ratio between the lateral width of the circumscribed rectangle and the lateral width of the character size, the ratio between the area of the circumscribed rectangle and the area of the character size.

The circumscribed rectangle and character size ratio calculation module 130 causes the circumscribed rectangle and character size ratio storage module 140 to store the ratio between the size of the circumscribed rectangle of the character image and the character size for each character as in a circumscribed rectangle and character size ratio table 200, for example. FIG. 2 is a schematic representation to show a data configuration example of the circumscribed rectangle and character size ratio table 200. The circumscribed rectangle and character size ratio table 200 has a character code column

210 and a circumscribed rectangle and character size ratio table column 220. The character code column 210 stores character codes. The circumscribed rectangle and character size ratio table column 220 stores the ratio between the size of the circumscribed rectangle of the character image and the character size.

The circumscribed rectangle and character size ratio storage module 140 is connected to the circumscribed rectangle and character size ratio calculation module 130 and stores the ratio between the size of the circumscribed rectangle in the character image representing the character and the character size corresponding to the character code. For example, the circumscribed rectangle and character size ratio table column 220 is stored.

FIG. 3 is a flowchart to show a generation processing example of the circumscribed rectangle and character size ratio table 200.

At step S302, the image acceptance module 110 accepts an image. This image is an image containing a character image whose character (character code) and character size are already known.

Processing from steps S304 to S312 is repeated as many times as the number of character images.

At step S306, the circumscribed rectangle extraction module 120 extracts the circumscribed rectangle of a character image. One character image exists in an area of a predetermined size and thus the character image in the area is extracted.

At step S308, the circumscribed rectangle and character size ratio calculation module 130 calculates the ratio between the size of the circumscribed rectangle extracted at step S306 and the character size.

At step S310, the circumscribed rectangle and character size ratio calculation module 130 causes the circumscribed rectangle and character size ratio storage module 140 to store the ratio between the size of the circumscribed rectangle and the character size in a pair with the character (character code).

Figure 4:
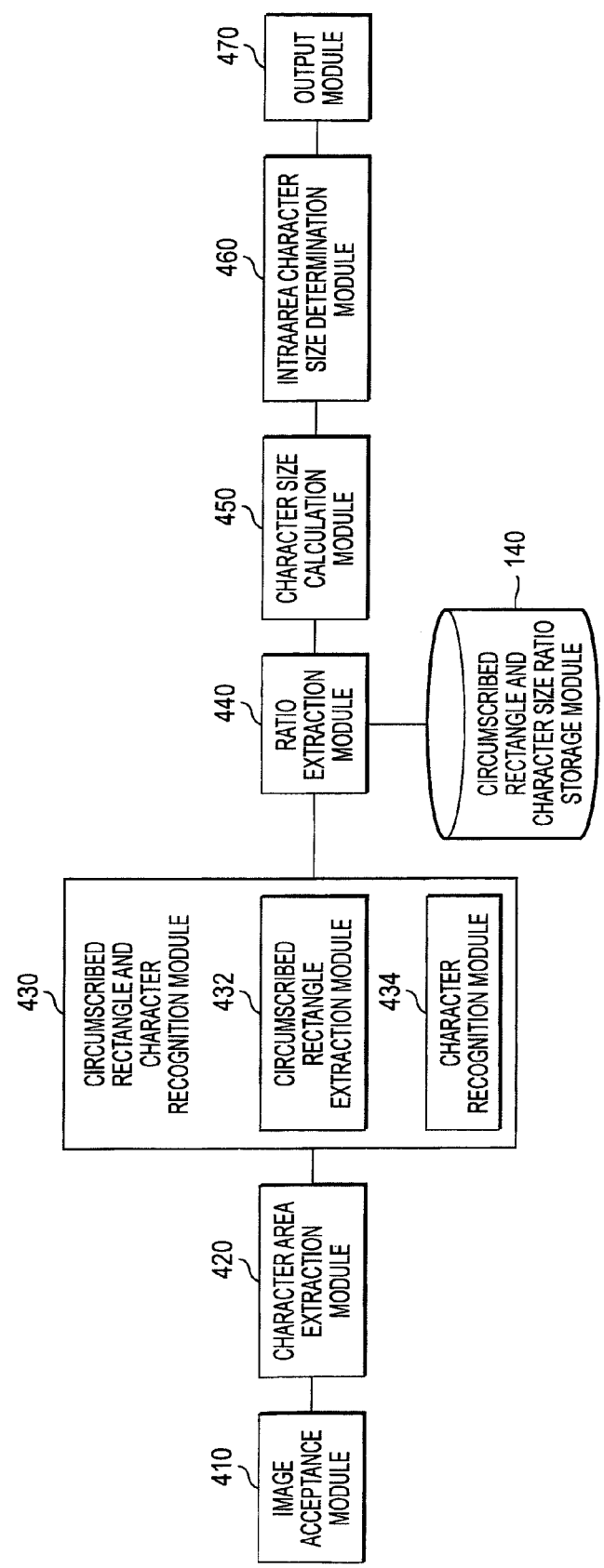
FIG. 4 is a conceptual module block diagram about a configuration example of a first exemplary embodiment of the invention.

An image processing device of a first exemplary embodiment has an image acceptance module 410, a character area extraction module 420, a circumscribed rectangle and character recognition module 430, a ratio extraction module 440, a character size calculation module 450, an intraarea character size determination module 460, an output module 470, and a circumscribed rectangle and character size ratio storage module 140, as shown in an example in FIG. 4. A module identical with that of the image processing device described above is denoted by the same reference numeral and will not be discussed again.

The image acceptance module 410 is connected to the character area extraction module 420, accepts an image, and passes the image to the character area extraction module 420. Accepting an image includes, for example, reading an image with a scanner, a camera, etc., receiving an image from an external device through a communication line using a fax, etc., photographing an image with CCD (Charge-Coupled-Device), etc., reading an image stored in a hard disk (not only a hard disk contained in a computer, but also a hard disk connected through a network, etc.,), and the like. The image may be a binary image or a multivalued image (containing a color image). The number of accepted images may be one or may be two or more. An image may contain a character image; for example, it may be a document used for business, an advertisement pamphlet, etc.

The character area extraction module 420 is connected to the image acceptance module 410 and the circumscribed rectangle and character recognition module 430, extracts a character area in the image accepted by the image acceptance module 410, and passes the character area to the circumscribed rectangle and character recognition module 430. The character area refers to an area containing a character image, specifically corresponds to a paragraph, etc., and may be an area of two or more lines or may be an area of only one line. Various techniques of extracting a character area exist; an existing technique may be used. For example, the features of a pixel mass (size, the number of holes, etc.,) are extracted and in the feature space, an area close to the features of character image may be determined to be the area of character image. The pixel mass refers to a continuous pixel area in 4-concatenation or 8-concatenation.

The circumscribed rectangle and character recognition module 430 is connected to the character area extraction module 420 and the ratio extraction module 440 and has a circumscribed rectangle extraction module 432 and a character recognition module 434. The circumscribed rectangle and character recognition module 430 recognizes a character image in the character area extracted by the character area extraction module 420, associates the character code and the size of the circumscribed rectangle of the character image with each other, and passes them to the ratio extraction module 440.

The circumscribed rectangle extraction module 432 extracts the circumscribed rectangle of the character image in a character area.

The character recognition module 434 recognizes the character image in a character area. Either of the circumscribed rectangle extraction module 432 and the character recognition module 434 may first perform processing. The character image corresponds to the character image of the circumscribed rectangle extracted by the circumscribed rectangle extraction module 432. Therefore, the circumscribed rectangle and the character code correspond to each other. For example, if the circumscribed rectangle extraction module 432 first performs processing, the character recognition module 434 performs character recognition for the character image of the circumscribed rectangle extracted by the circumscribed rectangle extraction module 432. If the character recognition module 434 first performs processing, the circumscribed rectangle extraction module 432 extracts a circumscribed rectangle for the character image recognized by the character recognition module 434. The character recognition module 434 may have the function of the circumscribed rectangle extraction module 432. That is, as the recognition result, the circumscribed rectangle of the character image to be recognized may be contained together with the character code.

If the character code of the recognition result of the character recognition module 434 is a predetermined character code, any one or more of the circumscribed rectangle extraction module 432, the ratio extraction module 440, the character size calculation module 450, or the intraarea character size determination module 460 may skip processing of the character code or the character image corresponding to the character code. For example, specifically the circumscribed rectangle extraction module 432, the ratio extraction module 440, the character size calculation module 450, or the intraarea character size determination module 460 determines whether or not the character code is a predetermined character code and if the character code is the predetermined character code, processing by the module is performed.

The predetermined character code is, for example, an easily erroneously recognized symbol (a period, a comma, punctuation, etc.,). Alternatively, it may be a character identification code of a character whose erroneous recognition rate in the character recognition module 434 is higher than a predetermined value. When a character is erroneously recognized, if processing of the ratio extraction module 440, the character size calculation module 450, etc., is later performed using the character code or the character image corresponding to the character code, the character size also becomes erroneous. To prevent this, that processing described above is performed.

The character recognition module 434 may calculate certainty when recognizing a character image and may output certainty of recognition associated with the character code as the recognition result.

In this case, any one or more of the circumscribed rectangle extraction module 432, the ratio extraction module 440, the character size calculation module 450, or the intraarea character size determination module 460 may skip processing of the character code or the character image corresponding to the character code based on comparison between certainty of recognition of the recognition result of the character recognition module 434 and a predetermined value.

For example, certainty of recognition is represented by a numeric value between 0 and 1 and when the value is high, if the possibility of erroneous recognition is low, the predetermined value is a numeric value between 0 and 1 and the expression "based on comparison" is used to mean that "certainty of recognition is larger than the predetermined value." In contrast, when certainty of recognition is a low value, if the possibility of erroneous recognition is low, the expression "based on comparison" is used to mean that "certainty of recognition is smaller than the predetermined value."

For example, specifically the circumscribed rectangle extraction module 432, the ratio extraction module 440, the character size calculation module 450, or the intraarea character size determination module 460 makes a comparison between certainty of recognition and the predetermined value and if the relation described above is included, processing by the module is performed.

The ratio extraction module 440 is connected to the circumscribed rectangle and character recognition module 430, the character size calculation module 450, and the circumscribed rectangle and character size ratio storage module 140, extracts the ratio between the size of the circumscribed rectangle and the character size corresponding to the character code stored in the circumscribed rectangle and character size ratio storage module 140 based on the character code of the recognition result of the character recognition module 434, and passes the ratio between the size of the circumscribed rectangle and the character size to the character size calculation module 450. The circumscribed rectangle and character size ratio storage module 140 stores the ratio between the size of the circumscribed rectangle and the character size in the character image representing the character corresponding to the character code (for example, the circumscribed rectangle and character size ratio table 200) as described above.

The character size calculation module 450 is connected to the ratio extraction module 440 and the intraarea character size determination module 460, calculates the character size of the character image based on the size of the circumscribed rectangle extracted by the circumscribed rectangle extraction module 432 and the ratio between the size of the circumscribed rectangle and the character size extracted by the ratio extraction module 440, and passes the character size to the intraarea character size determination module 460. For example, if the ratio between the size of the circumscribed rectangle and the character size is (character size/size of circumscribed rectangle), the size of the circumscribed rectangle of the character image in the image of character code is multiplied, thereby calculating the character size. If the ratio between the size of the circumscribed rectangle and the character size is (size of circumscribed rectangle/character size), the size of the circumscribed rectangle of the character image in the image of character code is divided by the ratio, thereby calculating the character size. If the ratio between the size of the circumscribed rectangle and the character size is ((size of circumscribed rectangle) to (character size)), the size of the circumscribed rectangle of the character image in the image of character code is divided by (size of circumscribed rectangle) in the ratio and (character size) in the ratio is multiplied, thereby calculating the character size.

The intraarea character size determination module 460 is connected to the character size calculation module 450 and the output module 470, determines the character size of the character image in the character area based on the character size calculated by the character size calculation module 450, of the character image in the character area extracted by the character area extraction module 420, and passes the character size to the output module 470 in association with the character area. Generally, the inside of the character area is the unified character size and thus corresponds to it. For example, statistical processing may be performed for the character size in the character area and the character size may be determined. More specifically, any one of the average value, the most frequent value, the center value, etc., of the character size in the character area may be determined to be the character size in the character area.

The output module 470 is connected to the intraarea character size determination module 460 and outputs the character size and the character area in association with each other. The character code may be contained in output and the character size may be output as the attribute of the character code. Output contains, for example, print on a printer, etc., display on a display, etc., storage on a memory medium of a memory card, etc., passing to any other information processing device or information processing module, etc. For example, data may be output to a document creation module of word processing software, etc., the document creation module may display character code in its character size, and an image accepted by the image acceptance module 410 may be handled as a document made up of character codes.

The output module 470 may execute conversion for the character size conforming to the resolution of the output destination. For example, in the embodiment, the character size is the character size in 600 dpi (dots per inch) as the resolution and if the resolution of the output destination is 96 dpi, the resolution may be converted from 600 dpi to 96 dpi before output.

Figure 5:
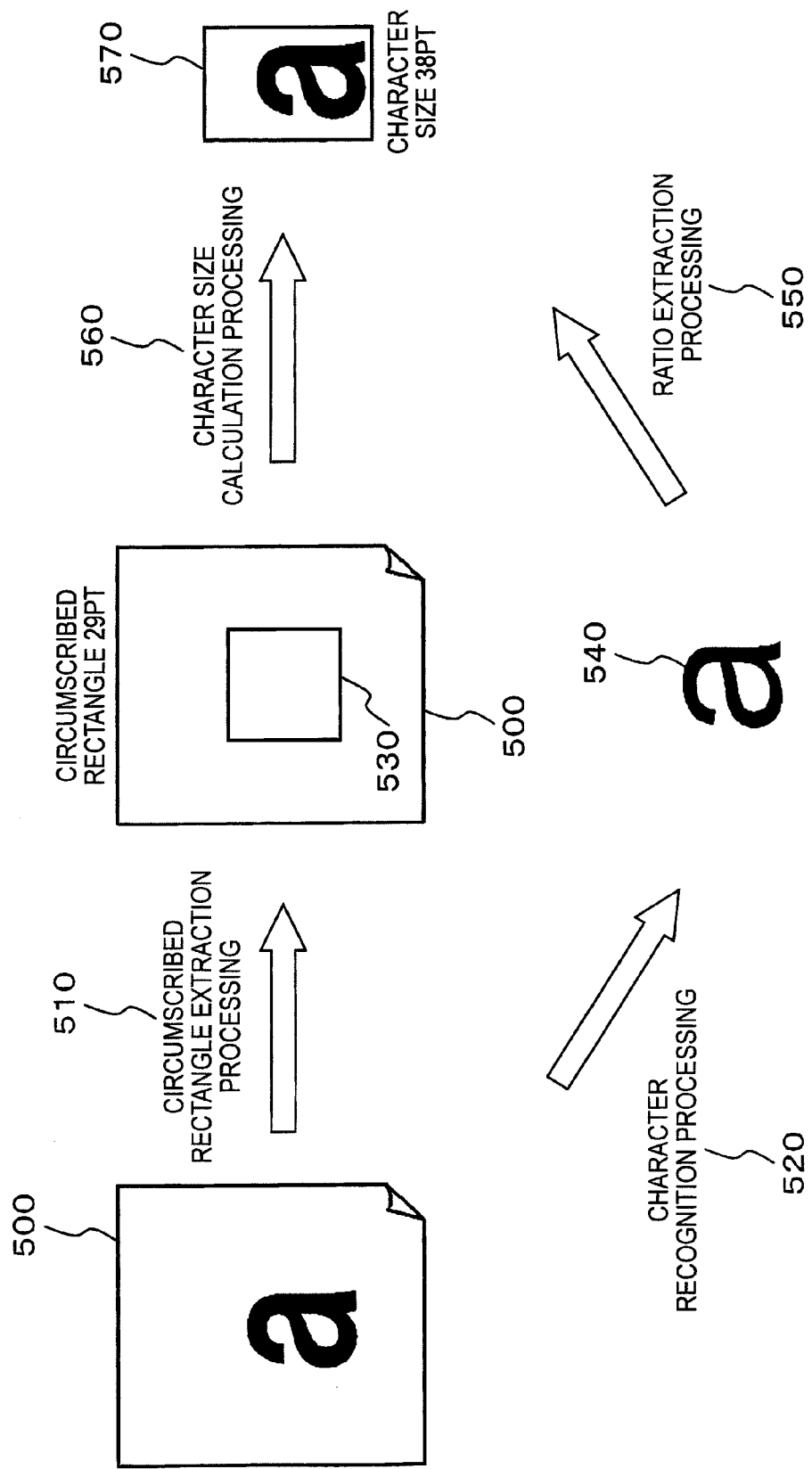
FIG. 5 is a schematic representation to show an outline of a processing example according to the first exemplary embodiment of the invention.

FIG. 5 is a schematic representation to show an outline of a processing example according to the first exemplary embodiment of the invention.

The image acceptance module 410 accepts an image 500. The circumscribed rectangle extraction module 432 performs circumscribed rectangle extraction processing 510. It is assumed that 29 points are extracted as the size of a circumscribed rectangle 530. The character recognition module 434 performs character recognition processing 520. It is assumed that character code "a" is recognized as character recognition result 540. The ratio extraction module 440 performs ratio extraction processing 550 of the ratio corresponding to the character code "a" from the circumscribed rectangle and character size ratio storage module 140. The character size calculation module 450 calculates 38 points as a character size 570 from the size 29 points of the circumscribed rectangle 530 using the ratio.

Figure 6:
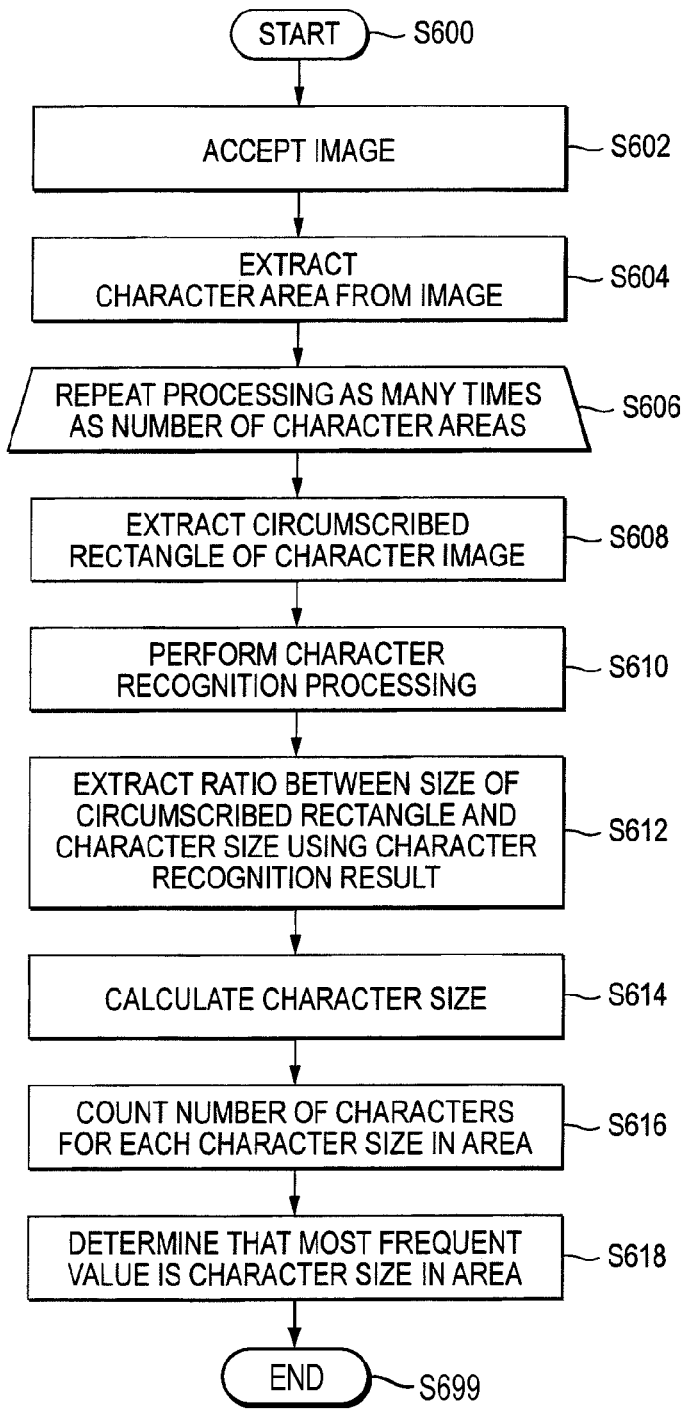
FIG. 6 is a flowchart to show a processing example according to the first exemplary embodiment of the invention.

FIG. 6 is a flowchart to show a processing example according to the first exemplary embodiment of the invention.

At step S602, the image acceptance module 410 accepts an image.

At step S604, the character area extraction module 420 extracts a character area from the image.

Processing from steps S606 to S620 is repeated as many times as the number of character areas.

At step S608, the circumscribed rectangle extraction module 432 extracts the circumscribed rectangle of the character image in the character area.

At step S610, the character recognition module 434 performs character recognition processing.

At step S612, the ratio extraction module 440 extracts the ratio between the size of the circumscribed rectangle and the character size from the circumscribed rectangle and character size ratio storage module 140 using the character recognition result.

At step S614, the character size calculation module 450 calculates the character size from the ratio between the size of the circumscribed rectangle and the character size extracted at step S612.

At step S616, the intraarea character size determination module 460 counts the number of characters for each character size in the character area.

At step S618, the intraarea character size determination module 460 determines that the most frequent value is the character size in the character area, for example.

Second Embodiment

Figure 7:
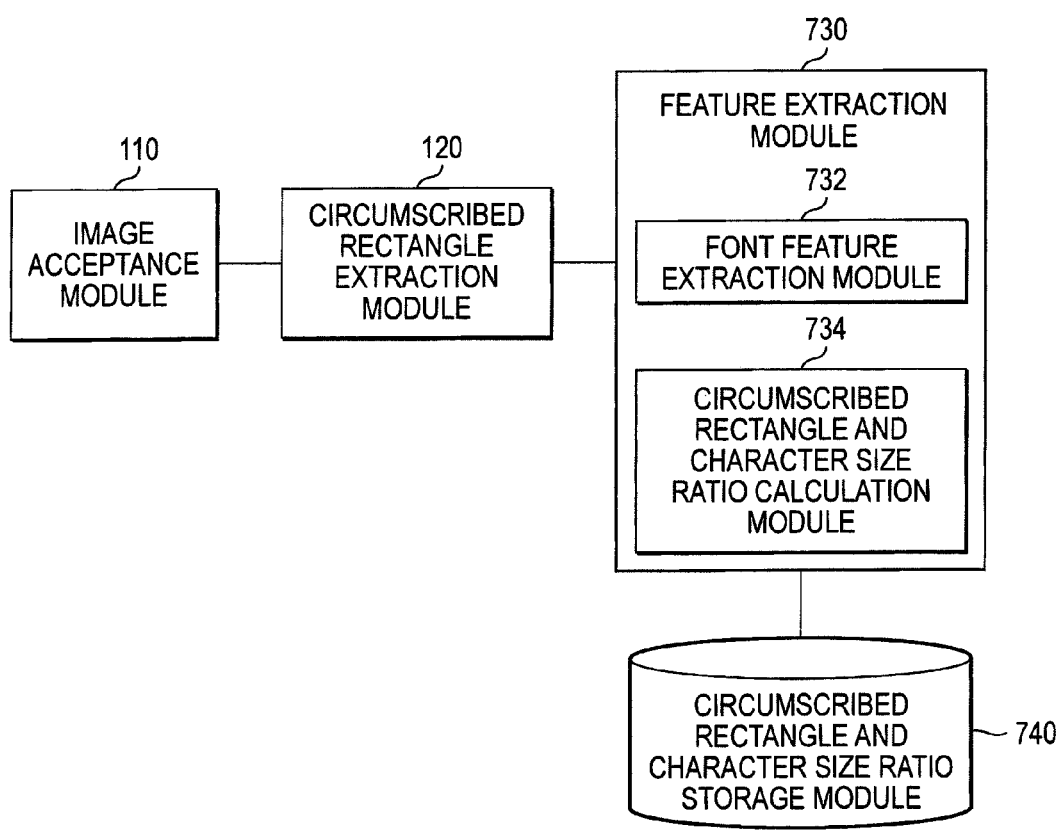
FIG. 7 is a conceptual module block diagram about a configuration example of an image processing device for generating a circumscribed rectangle and character size ratio table for each font.

To being with, a processing example of generating a circumscribed rectangle and character size ratio table for each font 900, a font feature table 1000, or a font character image table 1100 as preprocessing will be discussed. FIG. 7 is a conceptual module block diagram about a configuration example of an image processing device for generating the circumscribed rectangle and character size ratio table for each font 900.

The image processing device has an image acceptance module 110, a circumscribed rectangle extraction module 120, a feature extraction module 730, and a circumscribed rectangle and character size ratio storage module 740 for finding the ratio between the size of a circumscribed rectangle and a character size for each typeface type. Modules identical with those of the image processing device described above are denoted by the same reference numerals and will not be discussed again.

The image acceptance module 110 is equal to the image acceptance module 110 illustrated in FIG. 1, but the accepted image is an image containing a character image whose character, character size, and font type are already known. The typeface type refers to the font type; for example, Mincho typeface, Gothic type, sans serif, italic type, and the like exist. Hereinafter, the typeface will also be called font.

The feature extraction module 730 is connected to the circumscribed rectangle extraction module 120 and the circumscribed rectangle and character size ratio storage module 740 and has a font feature extraction module 732 and a circumscribed rectangle and character size ratio calculation module 734.

The font feature extraction module 732 extracts the font feature of each character image and causes the circumscribed rectangle and character size ratio storage module 740 to store the font feature in association with the character code. As the font feature, for example, a projection image projected in either or both of the longitudinal direction and the lateral direction of the character image, the feature of the projection image (for example, the peak position in the projection image, the peak height, the peak width, etc., exists. The peak refers to projection larger than a predetermined value), the character image, etc., exists. The projection image is provided by counting the number of pixels in the longitudinal direction or the lateral direction and is also called histogram.

For example, the circumscribed rectangle and character size ratio storage module 740 is caused to store a table in which character code, font type, and the feature of projection image of character image are associated with each other like the font feature table 1000. FIG. 10 is a schematic representation to show a data configuration example of the font feature table 1000. The font feature table 1000 has a character code column 1010, a font type column 1020, and a projection feature column 1030. The character code column 1010 stores character codes. The font type column 1020 stores font types. The projection feature column 1030 stores the features of projection images (either or both of each projection image and the feature of the projection image).

For example, the circumscribed rectangle and character size ratio storage module 740 is caused to store a table in which character code and character image for each font type of the character code are associated with each other like the font character image table 1100. FIG. 11 is a schematic representation to show a data configuration example of the font character image table 1100. The font character image table 1100 has a character code column 1110, a font A character image column 1120, and a font B character image column 1130. The character code column 1110 stores character codes. The font A character image column 1120 stores character images of character codes in font A. The font B character image column 1130 stores character images of character codes in font B. Character images of character codes in any other font type may be stored.

The font feature extraction module 732 causes the circumscribed rectangle and character size ratio storage module 740 to store either or both of the font feature table 1000 and the font character image table 1100.

The circumscribed rectangle and character size ratio calculation module 734 is equal to the circumscribed rectangle and character size ratio calculation module 130 illustrated in FIG. 1. However, already known font type is used and for each character code and font type, the circumscribed rectangle and character size ratio storage module 740 is caused to store the ratio between the size of the circumscribed rectangle and the character size in the character image representing the character. The font type and the character size of the character image are already known and the size of the circumscribed rectangle of the character image is obtained from the circumscribed rectangle extraction module 120. The ratio may be represented as the ratio like a:b or may be represented as a fraction ((size of circumscribed rectangle of character image/character size) or (character size/size of circumscribed rectangle of character image)) or a decimal fraction form of the fraction.

Figure 9:
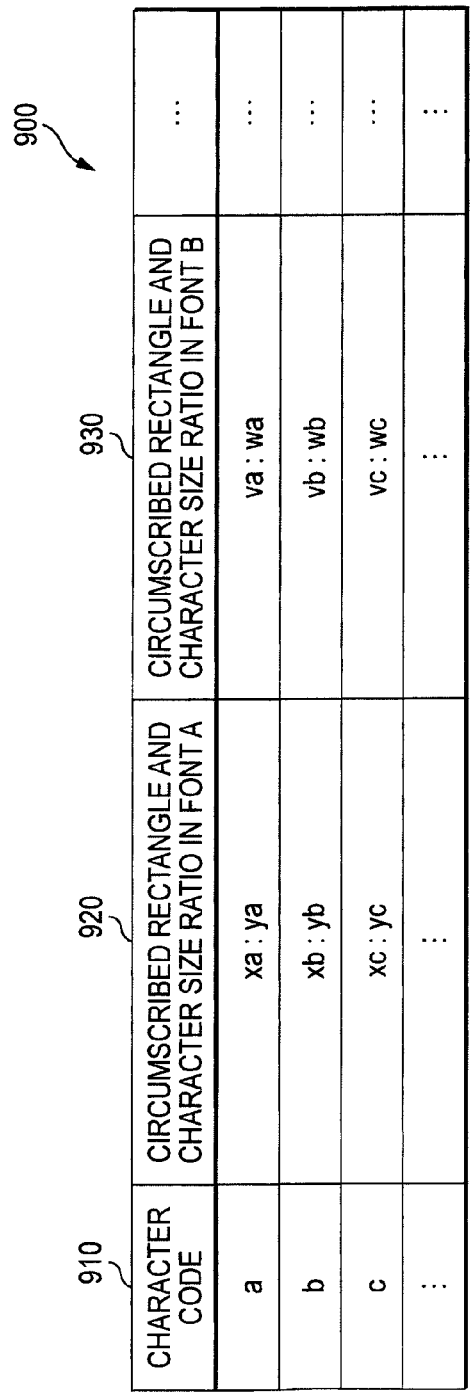
FIG. 9 is a schematic representation to show a data configuration example of a circumscribed rectangle and character size ratio table for each font.

For example, the circumscribed rectangle and character size ratio storage module 740 is caused to store the ratio between the size of the circumscribed rectangle and the character size of the character image in the font type for each character as in the circumscribed rectangle and character size ratio table for each font 900. FIG. 9 is a schematic representation to show a data configuration example of the circumscribed rectangle and character size ratio table for each font 900. The circumscribed rectangle and character size ratio table for each font 900 has a character code column 910, a column of a circumscribed rectangle and character size ratio in font A 920, etc. The character code column 910 stores character codes. The column of a circumscribed rectangle and character size ratio in font A 920 stores the ratio between the size of the circumscribed rectangle and the character size of character image in font A. A column of a circumscribed rectangle and character size ratio in font B 930 stores the ratio between the size of the circumscribed rectangle and the character size of character image in font B. The ratio between the size of the circumscribed rectangle and the character size of character image in any other font may be stored.

The circumscribed rectangle and character size ratio storage module 740 is connected to the feature extraction module 730 and stores the ratio between the size of the circumscribed rectangle and the character size in the character image representing the character for each character code and font type. For example, the module stores the circumscribed rectangle and character size ratio table for each font 900. The module stores the font feature of the character image representing the character for each character code and font type. For example, the module stores either or both of the font feature table 1000 and the font character image table 1100.

Figure 8:
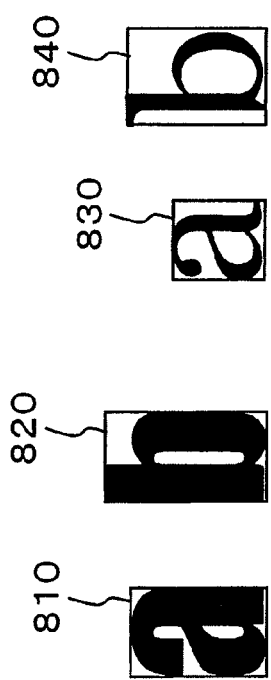
FIGS. 8(*a*) and 8(*b*) are schematic drawings to show examples of the ratio between the size of the circumscribed rectangle and the character size.
Figure 8:
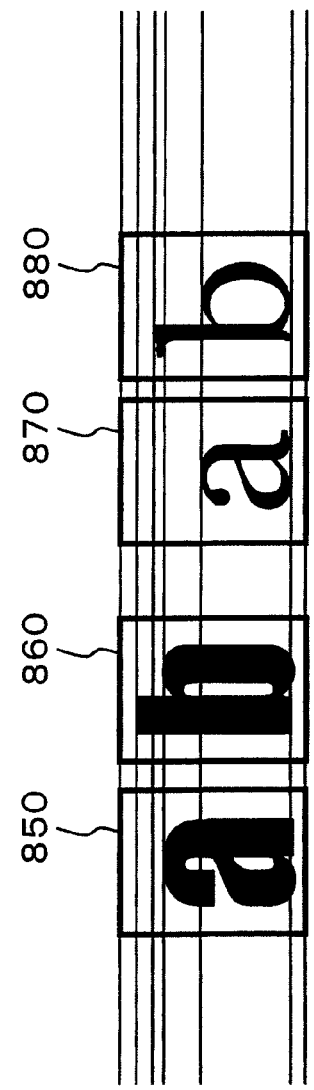

FIG. 8 is a schematic drawing to show examples of the ratio between the size of the circumscribed rectangle and the character size varying from one font type to another.

FIG. 8 (*a*) illustrates the circumscribed rectangles of alphabetic characters "a" and "b" in two types of fonts. Although the character sizes are the same, the sizes of the circumscribed rectangles vary according to the characters and the fonts. Even if the characters are the same "a" characters, the sizes vary like circumscribed rectangles 810 and 830 and even if the characters are the same "b" characters, the sizes vary like circumscribed rectangles 820 and 840. FIG. 8 (*a*) also shows that the sizes of the circumscribed rectangles vary according to the characters if the font is the same, as described above.

FIG. 8 (*b*) illustrates the character sizes of the characters illustrated in FIG. 8 (*a*). Thus, if the characters and the fonts vary, the character sizes are the same.

Therefore, the ratio between the size of the circumscribed rectangle and the character size vary for each character according to the font type. In the second embodiment, the ratio between the size of the circumscribed rectangle and the character size is stored in the circumscribed rectangle and character size ratio table for each font 900 in the circumscribed rectangle and character size ratio storage module 740 for each font type, as illustrated in FIG. 9.

Figure 12:
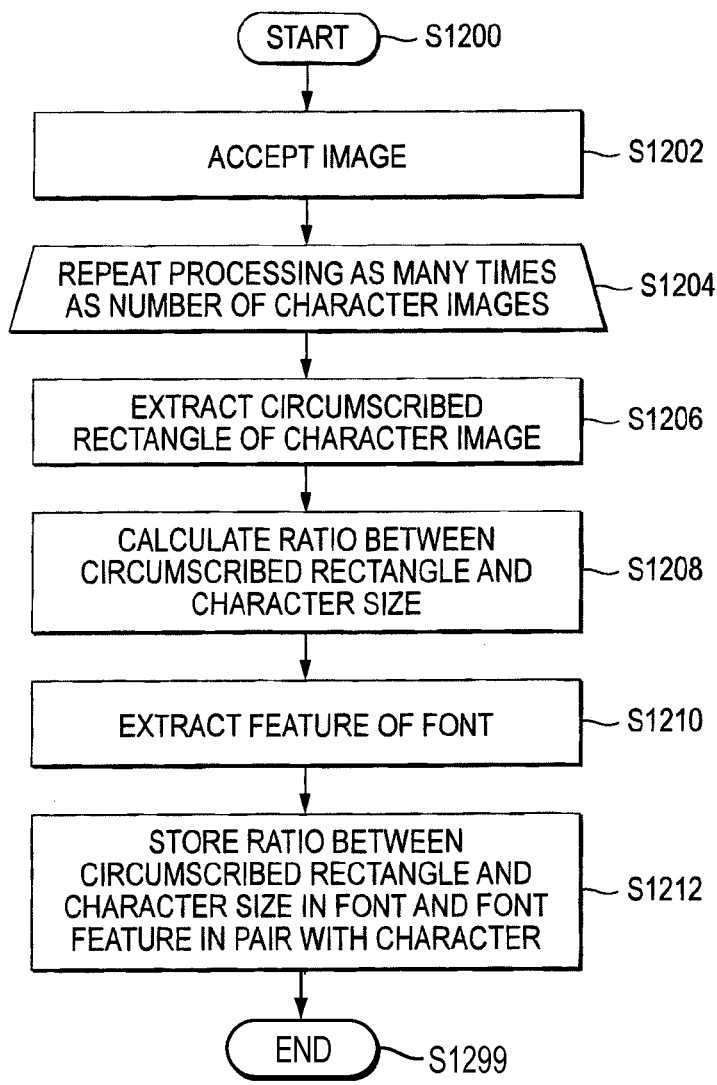
FIG. 12 is a flowchart to show a generation processing example of the circumscribed rectangle and character size ratio table for each font.

FIG. 12 is a flowchart to show a generation processing example of the circumscribed rectangle and character size ratio table for each font 900.

At step S1202, the image acceptance module 110 accepts an image. This image is an image containing a character image whose character (character code), font type, and character size are already known.

Processing at steps 1204 to S1214 is repeated as many times as the number of character images.

At step S1206, the circumscribed rectangle extraction module 120 extracts the circumscribed rectangle of a character image. Since one character image exists in an area of a predetermined size, the character image in the area is extracted.

At step S1208, the circumscribed rectangle and character size ratio calculation module 734 calculates the ratio between the size of the circumscribed rectangle extracted at step S1206 and the character size.

At step S1210, the font feature extraction module 732 extracts the feature of font.

At step S1212, the feature extraction module 730 causes the circumscribed rectangle and character size ratio storage module 740 to store the ratio between the size of the circumscribed rectangle and the character size in the font in a pair with the character (character code) and the font feature in the character in a pair with the character (character code).

Figure 13:
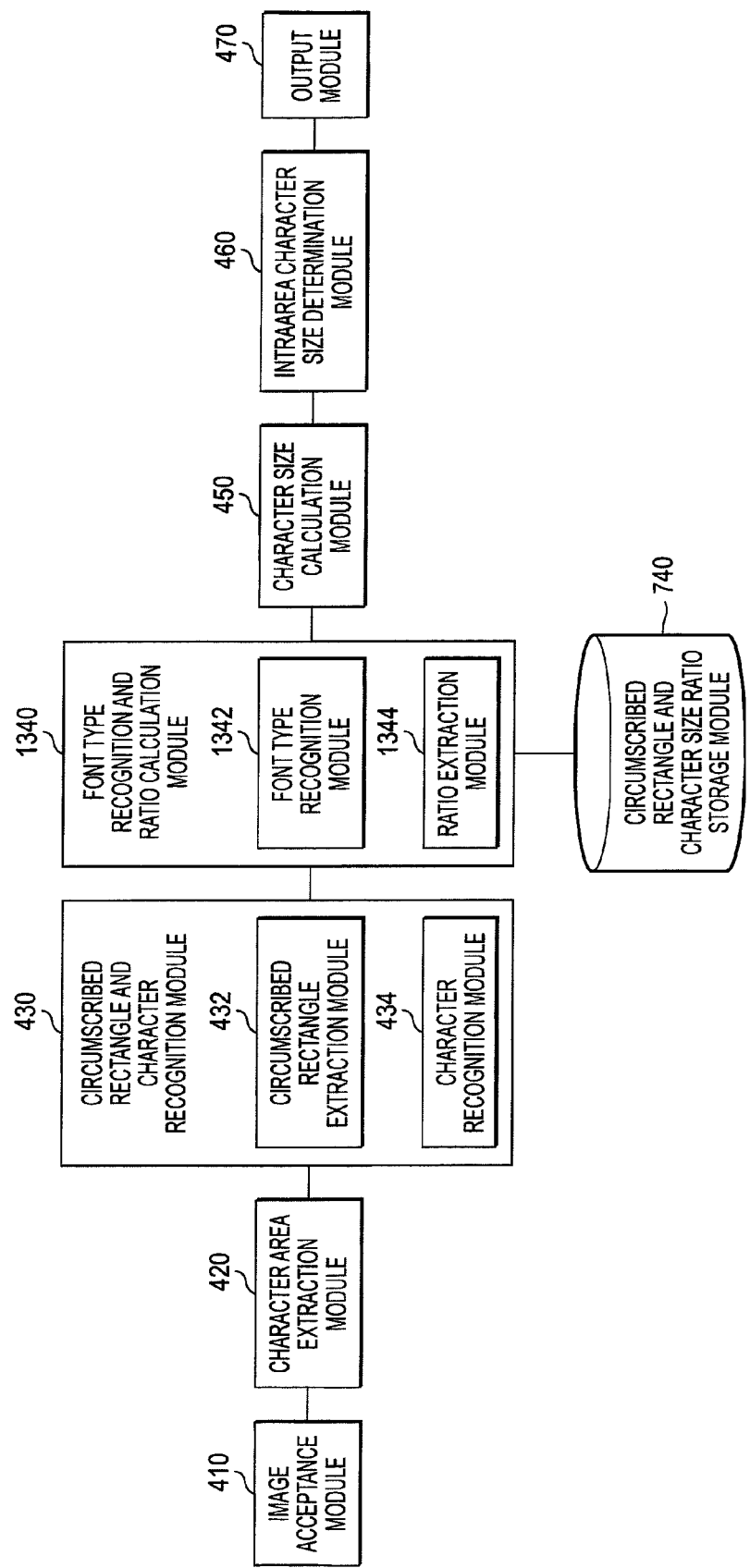
FIG. 13 is a conceptual module block diagram about a configuration example of a second exemplary embodiment of the invention.

FIG. 13 is a conceptual module block diagram about a configuration example of the second exemplary embodiment of the invention.

The image processing device has an image acceptance module 410, a character area extraction module 420, a circumscribed rectangle and character recognition module 430, a font type recognition and ratio calculation module 1340, a circumscribed rectangle and character size ratio storage module 740, a character size calculation module 450, an intraarea character size determination module 460, and an output module 470. Modules identical with those of the image processing device described above are denoted by the same reference numerals and will not be discussed again.

The font type recognition and ratio calculation module 1340 is connected to the circumscribed rectangle and character recognition module 430, the character size calculation module 450, and the circumscribed rectangle and character size ratio storage module 740, and has a font type recognition module 1342 and a ratio extraction module 1344.

The font type recognition module 1342 recognizes the font type of the character image recognized by a character recognition module 434. It recognizes the font type of the character image using either or both of the font feature table 1000 and the font character image table 1100 stored in the circumscribed rectangle and character size ratio storage module 740, for example.

If the font feature table 1000 is used and the projection feature column 1030 stores the projection image as the feature of the projection image, the font type recognition module 1342 generates a projection image of the character image recognized by the character recognition module 434, performs matching processing of the projection image and the projection image in the projection feature column 1030 corresponding to the character code, and if the mismatch pixel percentage is small as compared with a predetermined value, may determine the font type or may determine that the image with the smallest number of mismatch pixels is the font type.

If the font feature table 1000 is used and the projection feature column 1030 stores the feature of the projection image such as the peak position in the projection image, the font type recognition module 1342 extracts the feature of the projection image of the character image recognized by the character recognition module 434, makes a comparison between the feature of the extracted projection image and the feature of the projection image in the projection feature column 1030, and if the difference is small as compared with a predetermined value, may determine the font type or may determine that the image with the smallest difference is the font type.

To use the font character image table 1100, the font type recognition module 1342 extracts the character image recognized by the character recognition module 434, performs matching processing of the extracted character image and the character image in the font A character image column 1120, etc., and if the mismatch pixel percentage is small as compared with a predetermined value, may determine the font type or may determine that the image with the smallest number of mismatch pixels is the font type. After the size of the circumscribed rectangle of the character image in the font A character image column 1120, etc., is matched with the size of the character image recognized by the character recognition module 434 or after the size of the character image recognized by the character recognition module 434 is matched with the size of the circumscribed rectangle of the character image in the font A character image column 1120, etc., the matching processing may be performed.

The ratio extraction module 1344 extracts the ratio between the size of the circumscribed rectangle and the character size corresponding to the character code and the font type stored in the circumscribed rectangle and character size ratio storage module 740 based on the character code of the recognition result of the character recognition module 434 and the font type of the recognition result of the font type recognition module 1342. For example, to use the circumscribed rectangle and character size ratio table for each font 900 stored in the circumscribed rectangle and character size ratio storage module 740, the ratio between the size of the circumscribed rectangle and the character size is extracted according to the character code column 910 corresponding to the character code from the character recognition module 434 and the column of a circumscribed rectangle and character size ratio in font A 920, etc., corresponding to the font type from the font type recognition module 1342.

The circumscribed rectangle and character size ratio storage module 740 is connected to the font type recognition and ratio calculation module 1340 and stores the ratio between the size of the circumscribed rectangle and the character size in the character image representing the character for each character code and font type in association with each other. For example, the module stores the circumscribed rectangle and character size ratio table for each font 900. It may also store the font feature corresponding to the character code. For example, the module may store either or both of the font feature table 1000 and the font character image table 1100.

The character size calculation module 450 is connected to the font type recognition and ratio calculation module 1340 and the intraarea character size determination module 460 and performs equal processing to that of the character size calculation module 450 illustrated in FIG. 4; it calculates the character size of the character image based on the size of the circumscribed rectangle extracted by a circumscribed rectangle extraction module 432 and the ratio between the size of the circumscribed rectangle and the character size extracted by the ratio extraction module 1344, and passes the character size to the intraarea character size determination module 460.

As with the first embodiment described above, if the character code of the recognition result of the character recognition module 434 is a predetermined character code, any one or more of the circumscribed rectangle extraction module 432, the font type recognition module 1342, the ratio extraction module 1344, the character size calculation module 450, or the intraarea character size determination module 460 may skip processing of the character code or the character image corresponding to the character code.

As with the first embodiment described above, if the character recognition module 434 calculates certainty in recognizing the character image and outputs the certainty of the recognition as the recognition result in association with the character code, any one or more of the circumscribed rectangle extraction module 432, the font type recognition module 1342, the ratio extraction module 1344, the character size calculation module 450, or the intraarea character size determination module 460 may skip processing of the character code or the character image corresponding to the character code based on a comparison between the certainty of the recognition of the recognition result of the character recognition module 434 and a predetermined value.

Figure 14:
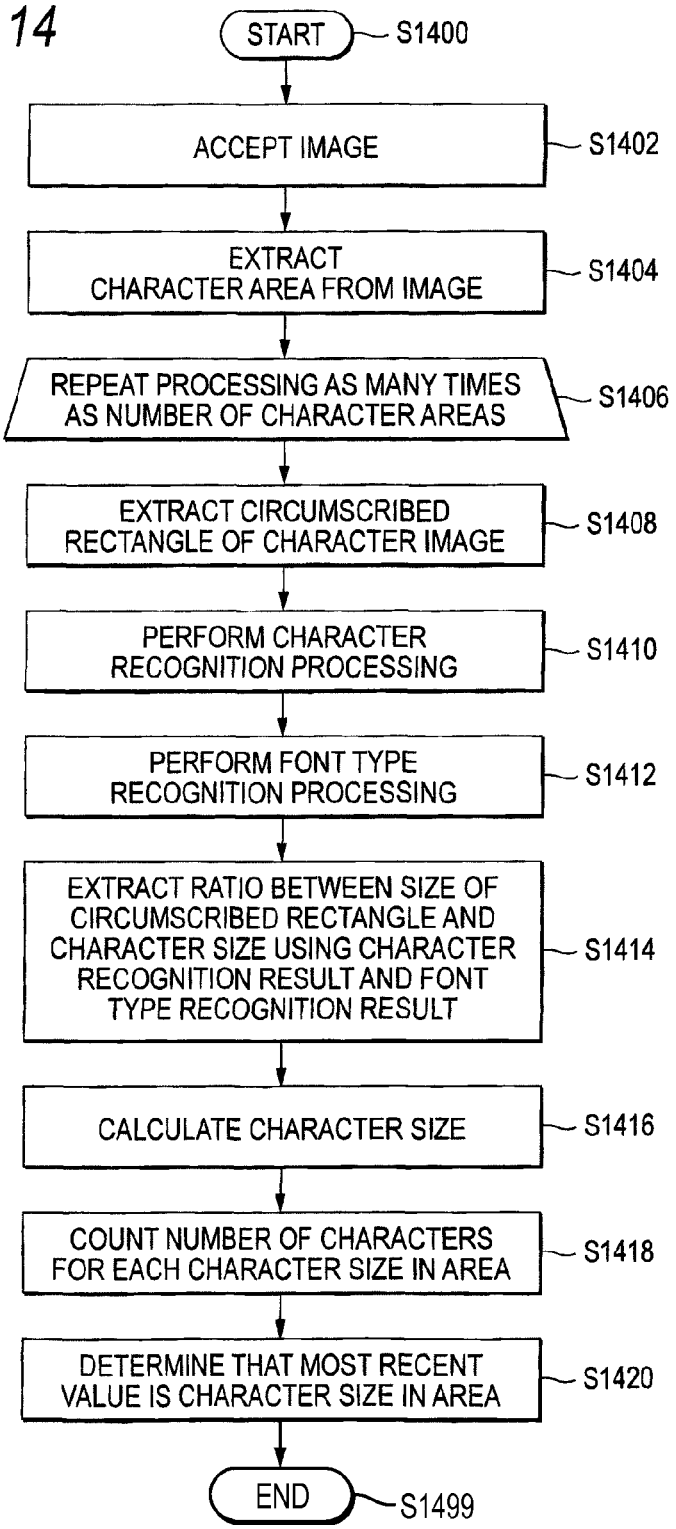
FIG. 14 is a flowchart to show a processing example according to the second exemplary embodiment of the invention.

FIG. 14 is a flowchart to show a processing example according to the second exemplary embodiment of the invention.

At step S1402, the image acceptance module 410 accepts an image.

At step S1404, the character area extraction module 420 extracts a character area from the image.

Processing from steps 1406 to 1422 is repeated as many times as the number of image areas.

At step S1408, the circumscribed rectangle extraction module 432 extracts the circumscribed rectangle of the character image.

At step S1410, the character recognition module 434 performs character recognition processing.

At step S1412, the font type recognition module 1342 performs recognition processing of the font type.

At step S1414, the ratio extraction module 1344 extracts the ratio between the size of the circumscribed rectangle and the character size from the circumscribed rectangle and character size ratio storage module 740 using the character recognition result and the font type recognition result.

At step S1416, the character size calculation module 450 calculates the character size from the ratio between the size of the circumscribed rectangle and the character size extracted at step S1414.

At step S1418, the intraarea character size determination module 460 counts the number of characters for each character size in the character area.

At step S1420, the intraarea character size determination module 460 determines that the most recent value is the character size in the character area, for example.

Figure 15:
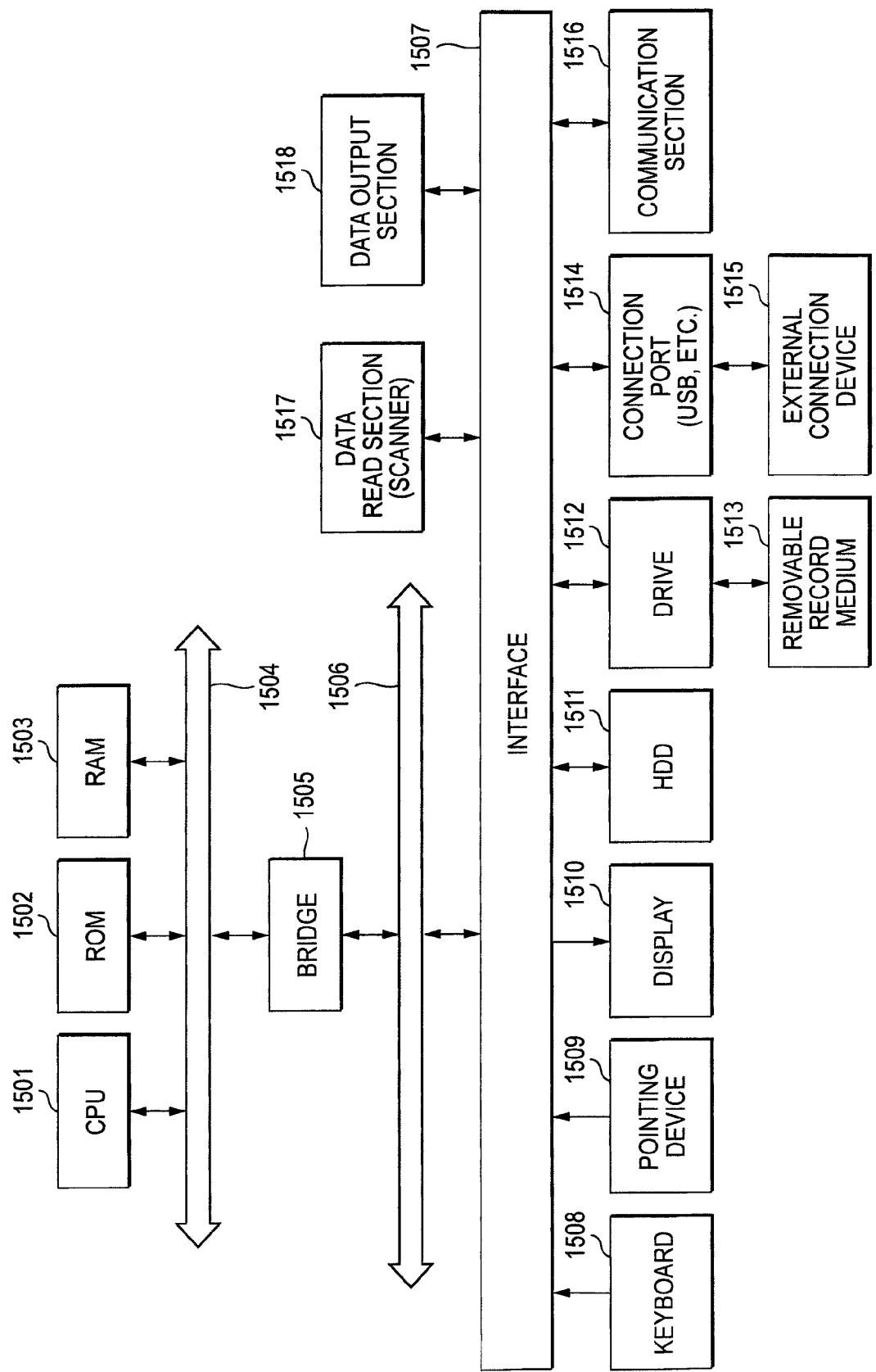
FIG. 15 is a block diagram to show a hardware configuration example of a computer for realizing the exemplary embodiments.

A hardware configuration example of the image processing devices shown in the examples in FIGS. 1, 4, 7, and 13 will be discussed with reference to FIG. 15. The configuration shown in FIG. 15 is implemented as a personal computer (PC), etc., for example, and the hardware configuration including a data read section 1517 of a scanner, etc., and a data output section 1518 of a printer, etc., is shown.

A CPU (Central Processing Unit) 1501 is a control section for executing processing in accordance with computer programs describing execution sequences of the various modules described above in the exemplary embodiments, namely, the circumscribed rectangle extraction module 120, the circumscribed rectangle and character size ratio calculation module 130, the character area extraction module 420, the circumscribed rectangle and character recognition module 430, the ratio extraction module 440, the character size calculation module 450, the intraarea character size determination module 460, the feature extraction module 730, the font type recognition and ratio calculation module 1340, etc.

ROM (Read-Only Memory) 1502 stores programs, computation parameters, etc., used by the CPU 1501. RAM (Random Access Memory) 1503 stores programs used in execution of the CPU 1501, parameters changed as required in the execution, and the like. They are connected by a host bus 1504 implemented as a CPU bus, etc.

The host bus 1504 is connected to an external bus 1506 of a PCI (Peripheral Component Interconnect/Interface) bus, etc., through a bridge 1505.

A keyboard and a pointing device 1509 of a mouse, etc., are input devices operated by the operator. A display 1510 is a liquid crystal display, a CRT (Cathode Ray Tube), etc., and displays various pieces of information as text and image information.

An HDD (Hard Disk Drive) 1511 contains a hard disk, drives the hard disk, and records or plays back the program and information executed by the CPU 1501. The hard disk stores accepted images, the circumscribed rectangle and character size ratio table 200, the circumscribed rectangle and character size ratio table for each font 900, the font feature table 1000, the font character image table 1100, extracted circumscribed rectangle, character size, etc. Further, it stores various computer programs of other various data processing programs, etc.

A drive 1512 reads data or a program recorded in a removable record medium 1513 of an attached magnetic disk, optical disk, a magneto-optical disk, semiconductor memory, etc., and supplies the data or the program to the RAM 1503 connected through the interface 1507, the external bus 1506, the bridge 1505, and the host bus 1504. The removable record medium 1513 may also be used as a data record area similar to the hard disk.

A connection port 1514 is a port for connecting an external connection device 1515 and has a connection section of USB, IEEE 1394, etc. The connection port 1514 is connected to the CPU 1501, etc., through the interface 1507, the external bus 1506, the bridge 1505, the host bus 1504, etc. A communication section 1516 is connected to a network and executes data communication processing with the outside. A data read section 1517 is, for example, a scanner and executes read processing of a document. A data output section 1518 is, for example, a printer and executes output processing of document data.

The hardware configuration of the image processing device shown in FIG. 15 shows one configuration example and the exemplary embodiment is not limited to the configuration in FIG. 15 and any configuration may be adopted if it makes it possible to execute the modules described in the exemplary embodiment. For example, some modules may be implemented as dedicated hardware (for example, an application specific integrated circuit (ASIC), etc.,) and some modules may be included in an external system and may be connected via a communication line and further a plurality of systems shown in FIG. 15 may be connected via a communication line so as to operate in cooperation with each other. The system may be built in a copier, a fax, a scanner, a printer, a multiple function device (image processing device having any two or more functions of a scanner, a printer, a copier, a fax, etc.,), or the like.

In the first or second exemplary embodiment described above, the intraarea character size determination module 460 may be excluded. The character sizes of character images in a character area are not unified and the character size of each character image calculated by the character size calculation module 450 may be adopted as the character size of the character.

Likewise, in the first or second exemplary embodiment described above, the character area extraction module 420 may be excluded. If an accepted image is made up of characters only, processing of the character area extraction module 420 need not be performed.

In the description of the exemplary embodiments, in comparison with the predetermined character, "equal to or more than," "equal to or less than," "larger than," and "smaller than (less than)" may be "larger than," "smaller than (less than)," "equal to or more than," "equal to or less than" respectively unless contraction occurs in the combination.

The described program may be provided as it is stored on a record medium or the program may be provided by communication means. In this case, for example, the described program may be grasped as the invention of a computer-readable record medium recording a program."

The expression "computer-readable record medium recording a program" is used to mean a record medium that can be read by a computer where a program is recorded, used to install and execute the program, to distribute the program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), Blue-ray Disc (registered trademark), magneto-optical disk (MO), flexible disk (FD), magnetic tape, hard disk, read-only memory (ROM), electrically erasable and programmable read-only memory (EEPROM), flash memory, random access memory (RAM), etc., for example.

The above-described program or a part thereof may be recorded in any of the described record media for retention, distribution, etc. The above-described program or a part thereof may be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and may be carried over a carrier wave.

Further, the above-described program may be a part of another program or may be recorded in a record medium together with a different program. It may be recorded as it is divided into a plurality of record media. It may be recorded in any mode if it can be restored, such as compression or encryption.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image processing device comprising:
a storage module that stores a reference ratio between a reference size of a reference circumscribed rectangle and a reference character size in a reference character image representing a reference character in association with a reference character identification code which uniquely identified the reference character;
a character recognition module that recognizes a character image in an image to get a character identification code from the recognized character image;
a circumscribed rectangle extraction module that extracts a circumscribed rectangle of the character image;
a ratio extraction module that extracts the reference ratio corresponding to the reference character identification code stored in the storage module based on the character identification code; and
a character size calculation module that calculates a character size of the character image based on a size of the circumscribed rectangle and the reference ratio extracted by the ratio extraction module.

2. The image processing device according to claim 1 further comprising a typeface recognition module that recognizes a reference font type of the character image recognized by the character recognition module,
wherein the reference ratio is set for each font types, the character recognition module recognizes the character image in the image so as to get the character identification code and a font type from the recognized character image;

the ratio extraction module extracts the reference ratio corresponding to the reference character identification code and the reference font type stored in the storage module based on the character identification code and the reference font type.

3. The image processing device according to claim 1 further comprising:

an area extraction module that extracts a character area in the image; and a determination module that determines the character size of the character image in the character area based on the character size calculated by the character size calculation module in the character area, wherein the character recognition module recognizes the character image in the character area, and the circumscribed rectangle extraction module extracts the circumscribed rectangle of the character image in the character area.

4. The image processing device according to claim 1, wherein when the character identification code obtained from the recognized character image is a predetermined character identification code, any one or more of the circumscribed rectangle extraction module, the ratio extraction module, the character size calculation module, or the determination module do not perform processing of the character identification code or the character image corresponding to the character identification code.

5. The image processing device according to claim 1, wherein the character recognition module calculates certainty when recognizing the character image and outputs the certainty of the recognition as the recognition result in association with the character identification code, and any one or more of the circumscribed rectangle extraction module, the ratio extraction module, the character size calculation module, or the determination module do not perform processing of the character identification code or the character image corresponding to the character identification code based on a comparison between the certainty of the recognition of the recognition result of the character recognition module and a predetermined value.

6. An image processing method comprising:

storing a reference ratio between a reference size of a reference circumscribed rectangle and a reference character size in a reference character image representing a reference character in association with a reference character identification code which uniquely identified the reference character;

recognizing a character image in an image to get a character identification code from the recognized character image;

extracting a circumscribed rectangle of the character image;

extracting the reference ratio corresponding to the reference character identification code stored in the storage step based on the character identification code; and calculating a character size of the character image based on a size of the circumscribed rectangle and the reference ratio extracted by the extraction step for the reference ratio.

7. A non-transitory computer readable medium storing a program causing a computer to execute a process for image processing, the process comprising:

storing a reference ratio between a reference size of a reference circumscribed rectangle and a reference character size in a reference character image representing a reference character in association with a reference character identification code which uniquely identified the reference character;

recognizing a character image in an image to get a character identification code from the recognized character image;

extracting a circumscribed rectangle of the character image;

extracting the reference ratio corresponding to the reference character identification code stored in the storage step based on the character identification code; and calculating a character size of the character image based on a size of the circumscribed rectangle and the reference ratio extracted by the extraction step for the reference ratio.

* * * * *